United States Patent [19]
Gage et al.

[11] Patent Number: 6,063,305
[45] Date of Patent: May 16, 2000

[54] REFRIGERANT COMPOSITIONS CONTAINING A HYDROFLUOROPROPANE AND A HYDROFLUOROCARBON

[75] Inventors: Cynthia L. Gage, Raleigh; Jane C. Bare, Carrboro; Norman Dean Smith, Raleigh, all of N.C.

[73] Assignee: The United States of America as represented by the Administrator of the Environmental Protection Agency, Washington, D.C.

[21] Appl. No.: 08/897,845

[22] Filed: Jul. 21, 1997

Related U.S. Application Data

[63] Continuation of application No. 08/165,970, Dec. 10, 1993, Pat. No. 5,650,089, which is a continuation of application No. 07/801,800, Dec. 3, 1991, abandoned.

[51] Int. Cl.[7] .................................................... C09K 5/04
[52] U.S. Cl. ............................................... 252/67; 62/114
[58] Field of Search ................................. 252/67; 62/114

[56] References Cited

U.S. PATENT DOCUMENTS

| | | | |
|---|---|---|---|
| 3,362,180 | 1/1968 | Eiseman, Jr. | 62/112 |
| 3,394,878 | 7/1968 | Eiseman, Jr. | 252/67 |
| 3,409,555 | 11/1968 | Eiseman, Jr. | 252/67 |
| 3,922,228 | 11/1975 | Hutchinson | 252/67 |
| 4,054,036 | 10/1977 | Murphy et al. | 252/67 |
| 4,157,979 | 6/1979 | Walters | 252/67 |
| 4,559,154 | 12/1985 | Powell | 252/69 |
| 4,948,526 | 8/1990 | Fellows et al. | 252/69 |
| 4,961,321 | 10/1990 | O'Neill et al. | 252/67 |
| 4,978,467 | 12/1990 | Shankland et al. | 252/69 |
| 4,994,202 | 2/1991 | Merchant | 134/38 |
| 5,023,009 | 6/1991 | Merchant | 252/67 |
| 5,023,010 | 6/1991 | Merchant | 252/67 |
| 5,026,498 | 6/1991 | Merchant | 134/38 |
| 5,087,383 | 2/1992 | Robeck et al. | 134/38 |
| 5,091,104 | 2/1992 | Van Der Puy | 134/38 |
| 5,264,462 | 11/1993 | Hudson et al. | 521/88 |
| 5,417,871 | 5/1995 | Minor et al. | 252/67 |
| 5,458,798 | 10/1995 | Lunger et al. | 252/67 |
| 5,484,546 | 1/1996 | Minor et al. | 252/67 |
| 5,538,658 | 7/1996 | Minor | 252/67 |
| 5,558,810 | 9/1996 | Minor et al. | 252/67 |
| 5,562,857 | 10/1996 | Werner et al. | 252/67 |
| 5,672,294 | 9/1997 | Lund et al. | 252/67 |
| 5,736,063 | 4/1998 | Richard et al. | 252/67 |

FOREIGN PATENT DOCUMENTS

| | | |
|---|---|---|
| 0 126 237 A3 | 11/1984 | European Pat. Off. |
| 0126237 | 11/1984 | European Pat. Off. |
| 0385737 | 5/1990 | European Pat. Off. |
| 384371 | 8/1990 | European Pat. Off. |
| 416777 | 3/1991 | European Pat. Off. |
| 0 427 604 A1 | 5/1991 | European Pat. Off. |
| 0427604 | 5/1991 | European Pat. Off. |
| 0451692 | 10/1991 | European Pat. Off. |
| 450855 | 10/1991 | European Pat. Off. |
| 2-272086 | 11/1990 | Japan |
| O2272086 | 11/1990 | Japan |
| 3-093890 | 4/1991 | Japan |
| 3-93883 | 4/1991 | Japan |
| 4-110384 | 4/1992 | Japan |
| 4-110386 | 4/1992 | Japan |
| 5-279659 | 10/1993 | Japan |
| 2274462 | 7/1994 | United Kingdom |
| 91/16390 | 10/1991 | WIPO |
| 9116390 | 10/1991 | WIPO |
| 9201762 | 2/1992 | WIPO |
| 9217558 | 10/1992 | WIPO |
| 93/14173 | 7/1993 | WIPO |
| 93/14175 | 7/1993 | WIPO |
| 94/02563 | 2/1994 | WIPO |
| 94/02564 | 2/1994 | WIPO |
| 95/08603 | 3/1995 | WIPO |
| 96/18384 | 6/1996 | WIPO |

OTHER PUBLICATIONS

Lorenz & Meutzner, On Application of Non–Aseothropic Two–Compoent Refrigerants in Domestic Refrigerators and Home Freezers, Proceedings from the International Institute of Refrigeration Convention 1–11 (Moscow 1985) No Month Available.

Didion, The Role of Refrigerant Mixtures as Alternatives, Proceedings of ASHRAE 1989 CFC Technology Conference 57–69, Sep. 27–28, 1989.

Morrison & McLinden, Application of a Hard Sphere Equation of State to Refrigerants and Refrigerant Mixtures. NBS Technical Note 1226 (U.S. Dept. Commerce), ch. 1–3, Aug. 1986.

Shank, Thermodynamic Properties of 1,1,1,2,2–Pentafluoropane (Refrigerant 245), *Journal of Chemical and Engineering Data*, 474–480 (1967). No month Available.

J. Haggin, Pressure to Market CFC Substitutes Challenges Chemical Industry, C&EN, Sep. 9, 1991, pp. 27–28.

Kazachki, G. et al., Proceedings of the 1992 Int'l Refrigeration Conference–Energy Efficiency and New Refrigerants, vol. II, Jul., 1992, pp. 595–605 No Month Available.

Gage et al., Proceedings of the 1992 Int'l Refrigeration Conference—Energy Efficiency and New Refrigerants, vol. I, Jul., 1992, pp. 611–619.

*Primary Examiner*—Christine Skane
*Attorney, Agent, or Firm*—Alston & Bird

[57] ABSTRACT

Azeotropes of hydrofluorocarbons and hydrofluoroethers useful for use as refrigerants are disclosed. Zeotropes of hydrofluoropropanes and hydrofluoroethers with hydrofluorocarbons, hydrofluoroethers, and hydrocarbons useful as refrigerants are also disclosed. The invention also includes refrigeration and heating processes in which these refrigerants are useful.

9 Claims, 1 Drawing Sheet

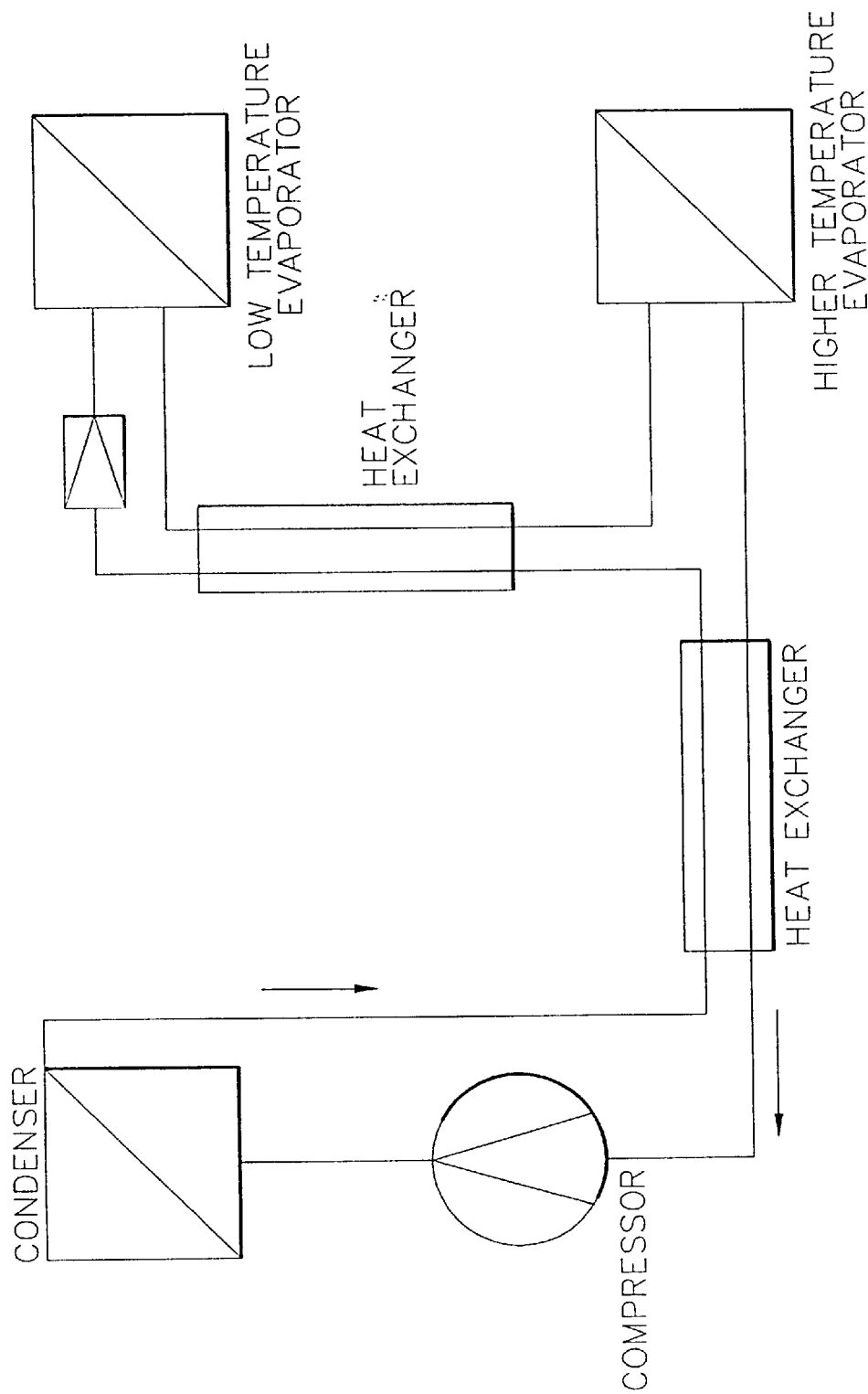

REFRIGERANT COMPOSITIONS CONTAINING A HYDROFLUOROPROPANE AND A HYDROFLUOROCARBON

This application is a continuation of application Ser. No. 08/165,970 filed Dec. 10, 1993, now U.S. Pat. No. 5,650,089 which is a continuation of application Ser. No. 07/801,800, filed Dec. 3, 1991 now abandoned.

FIELD OF THE INVENTION

The invention relates generally to refrigerants, and more specifically relates to compositions of refrigerants based on azeotropic and zeotropic mixtures containing hydrofluoropropanes and hydrofluoroethers, and hydrocarbons.

BACKGROUND OF THE INVENTION

The most common currently used refrigerants have been chlorine-containing fluorocarbons (CFCs), such as CFC-11, CFC-12, CFC-114, and CFC-115. The presence of chlorine in these compounds causes them, once released into the atmosphere, to deplete the Earth's stratospheric ozone layer. As a result of their harmful effects, the use of CFCs is being phased out of production. For example, in the United States, the diminished use of CFCs is mandated by the Montreal Protocol, a multi-national agreement to which the United States is a party; the terms of this treaty were codified by the Clean Air Act of 1990.

Research has focused on alternative non-chlorinated refrigerants. The physical characteristics of a ideal refrigerant include low boiling point, low or non-flammability, high thermal stability, high chemical stability with other compounds to which it is exposed, low toxicity, and high energy efficiency. Suggested alternatives to CFCs have included hydrofluoroethers (HFEs), see Eiseman, Jr., U.S. Pat. No. 3,362,180; O'Neill et al., U.S. Pat. No. 4,961,321; Powell, U.S. Pat. No. 4,559,154; hydrofluorocarbons (HFCs), see Walters, U.S. Pat. No. 4,157,979; Japanese Patent No. 2272-186; azeotropic mixtures of HFEs and HFCs with CFCs and hydrochlorofluorocarbons (HCFCs), see Fellows et al., U.S. Pat. No. 4,948,526; Murphy et al., U.S. Pat. No. 4,054,036; Snider et al., U.S. Pat. No. 3,536,627; Eiseman, Jr., U.S. Pat. No. 3,409,555 (although HCFCs are also being phased out by the 1990 Clean Air Act); and isolated azeotropic mixtures, see Eiseman, U.S. Pat. No. 3,394,878 (mixture of trifluoromethyl methyl ether and trifluoromethyl pentafluoroethyl ether); Shankland et al., U.S. Pat. No. 4,978,467 (mixture of pentafluoroethane and difluoromethane); Hutchinson, U.S. Pat. No. 3,922,228 (mixture of difluoromethyl trifluoromethylether and dimethyl ether).

These alternative refrigerants represent a wide range of boiling points; nevertheless, suitable replacements do not exist for all CFC and HCFC refrigerants. Problems researchers have encountered include the difficulty of manufacturing these refrigerants and the lower energy efficiency associated with many of them. Accordingly, new refrigerants that satisfy specific refrigeration requirements are always desirable. Corresponding processes that can fully capitalize on the properties of new refrigerants are also desirable.

SUMMARY OF THE INVENTION

The present invention includes two component azeotropes useful as refrigerants. The first component of the azeotrope is a hydrofluoropropane of the formula $C_3F_nH_{(8-n)}$ wherein n is 2, 3, 4, 5, 6, or 7, or a hydrofluoroether of the formula $C_2F_nH_{(6-n)}O$ wherein n is 2,3,4, or 5. The second component of the azeotrope is a hydrofluoroether of the formula $C_2F_nH_{(6-n)}O$ wherein n is 2,3,4, or 5, a hydrofluorocarbon of the formula $C_xF_nH_{(2x+2-n)}$ wherein x is 2 or 3, and wherein n is 2, 3, 4, 5, 6, or 7, or a saturated or unsaturated hydrocarbon containing 3, 4, or 5 carbon atoms. Preferred azeotropic mixtures are those containing $CF_3OCH_3$ and $CF_2HCH_3$, $CF_3OCH_3$ and $CF_2HCF_2H$, $CF_3CF_2CH_3$ and $CF_3CFHCF_3$, $CF_3CF_2CH_3$ and $CF_2HCF_2H$, $CF_3OCF_2H$ and cyclopropane, $CF_3CFH_2$ and $CF_3OCH_3$, and $CF_3OCF_2H$ and $CF_3CFH_2$.

A second aspect of the present invention is a cooling process in which any of the azeotrope refrigerants listed above are condensed, then evaporated in the vicinity of an object to be cooled. Additionally, the same process can be used to heat an object in the vicinity of the condensing refrigerant. Note that both heating and cooling processes may be characterized herein as processes of transferring heat by condensing the refrigerant in a first region to be heated, transferring the refrigerant to a second region to be cooled, and evaporating the refrigerant in the region to be cooled.

The present invention also includes zeotropic mixtures useful as refrigerants which include an ether of the formula $C_2F_nH_{(6-n)}O$, wherein n is 2, 3, 4, or 5, and a second compound selected from the group consisting of a hydrofluorocarbon of the formula $C_xF_nH_{(2x-n)}$, wherein x is 1, 2, or 3, and n is 2, 3, 4, 5, 6, or 7, a hydrofluoroether of the formula $C_2F_nH_{(6-n)}O$ wherein n is 2,3,4, or 5, and a saturated or unsaturated hydrocarbon containing 3, 4, or 5 carbon atoms. Preferred ethers include $CF_3OCH_3$ and $CF_3OCF_2H$. Preferred second compounds include $CF_2HCF_2CFH_2$, $CF_3CH_2CF_2H$, and $CF_2H_2$.

An additional aspect of the invention is a process in which the hydrofluoroether-based zeotropes listed above are condensed, then evaporated in the vicinity of an object to be cooled. Preferred is a process in which heat is transferred from or to the refrigerant counter-current heat exchanger. Also preferred is a process in which the azeotrope is evaporated in multiple evaporators with different cooling temperature requirements. Also is preferred is a process which utilizes composition shifting, in which it may be advantageous to use varying compositions of the same mixture depending on desired operation. The process can also be used to heat an object in the vicinity of the condensing refrigerant.

The present invention also includes zeotropic compositions which include a hydrofluoropropane of the formula $C_3F_nH_{(8-n)}$, wherein n is 2, 3, 4, 5, 6, or 7, and a second compound being selected from the group consisting of a hydrofluorocarbon of the formula $C_xF_nH_{(2x+2-n)}$, wherein x is 1, 2, or 3, and n is 2, 3, 4, 5, 6, or 7, and a saturated or unsaturated hydrocarbon containing 3, 4, or 5 carbon atoms. Preferred compositions of these zeotropes include mixtures of $CF_2HCF_2CFH_2$ and $CF_2HCH_3$, $CF_3CF_2CH_3$, $CF_3CH_2CF_2H$, $CF_3CFHCF_3$, $CF_3CFH_2$, $CF_2H_2$, cyclopropane, and $C_3H_8$; mixtures of $CF_3CH_2CF_2H$ and $CF_3CFH_2$, $CF_2H_2$, $CF_2HCH_3$, cyclopropane, and $C_3H_8$; a mixture of $CF_3CF_2CH_3$ and $CF_2H_2$; and a mixture of $CF_3CFHCF_3$ and $CF_2H_2$.

Another aspect of the invention is a process in which these hydrofluoropropane-based zeotropes are condensed, then evaporated in the vicinity of an object or area to be cooled. The process is preferably practiced with the inclusion of heat transfer to or from the refrigerant in a counter-current heat exchanger. Another preferred practice of the process includes multiple evaporation steps in multiple evaporators with different temperature requirements. Processes which include composition shifting are also preferred. The process can also be used to heat an object in the vicinity of the condensing refrigerant.

BRIEF DESCRIPTION OF THE DRAWINGS

FIG. 1 shows a schematic representation of a Lorenz-Meutzner refrigeration system used in analysis of zeotropic mixtures.

DETAILED DESCRIPTION OF THE INVENTION

The present invention includes novel refrigerant mixtures of combinations of hydrofluoroethers (HFEs), hydrofluorocarbons (HFCs), and hydrocarbons (HCs). The mixtures disclosed include azeotropic mixtures and zeotropic mixtures. It is understood that any component referred to as a "first component" is not necessarily the lowest boiling component of the mixture, as is common in the industry.

In thermodynamic terms, an azeotrope is a multicomponent mixture in which, during a phase change, the liquid and vapor component compositions remain identical. As a result, the components do not separate from one another during a phase change, but instead remain as a homogeneous mixture, and thus are desirable for many refrigeration operations. Azeotropes exhibit strictly constant-boiling behavior over only a very small range of composition mass ratios and temperatures; however, many azeotropes are essentially constant-boiling over a relatively wide-range of mass ratios and temperatures and are often termed "azeotrope-like". It is understood that the term "azeotrope" as used herein is intended to refer to both true azeotropes and azeotrope-like mixtures as defined above.

The present invention includes azeotropic compositions comprising HFE, HFC or hydrocarbon components. The first component of the azeotrope is selected from the group consisting of a hydrofluoropropane of the formula $C_3F_nH_{(8-n)}$ wherein n is 2, 3, 4, 5, 6, or 7, and a hydrofluoroether of the formula $C_2F_nH_{(6-n)}O$, wherein n is 2,3,4, or 5. The second component of the azeotrope is selected from the group consisting of a hydrofluoroether of the formula $C_2F_nH_{(6-n)}O$ wherein n is 2,3,4, or 5, a hydrofluorocarbon of the formula $C_xF_nH_{(2x+2-n)}$ wherein x is 2 or 3, and wherein n is 4, 5, 6, or 7, and a saturated or unsaturated hydrocarbon containing 3, 4, or 5 carbon atoms. It is understood that, if the first and second component are both HFEs or both HFCs, the first component and the second component are not the same chemical compound.

The invention includes as a preferred composition an azeotrope comprising a mixture of a hydrofluoroether of the formula $C_2F_nH_{(6-n)}O$, wherein n is 2,3,4, or 5, with a hydrofluorocarbon of the formula $C_xF_nH_{(2x+2-n)}$ wherein x is 2 or 3, and wherein n is 4, 5, 6, or 7. A more preferred mixture of this type are a mixture of $CF_3OCH_3$ and $CF_2HCH_3$, which is most preferred having a mass composition ratio of $CF_3OCH_3$ to $CF_2HCH_3$ of between 0.5:1 and 1.5:1. This azeotropic mixture has a boiling point of about −25° C. at 101.3 kPa. A second more preferred composition is an azeotrope comprising a mixture of $CF_3OCH_3$ and $CF_2HCF_2H$, which is most preferred having a mass composition ratio of $CF_3OCH_3$ to $CF_2HCF_2H$ of between 1:1 and 4:1. This most preferred azeotropic mixture has a boiling point of about −26° C. at 101.3 kPa. A third more preferred mixture of this type is an azeotrope comprising a mixture of $CF_3OCF_2H$ and $CF_3CFH_2$. A most preferred mass composition ratio of $CF_3OCF_2H$ and $CF_3CFH_2$ is between 2.5:1 and 4.5:1, which mixture has a boiling point of about −39° C. at 101.3 kPa. A fourth more preferred composition is a mixture of $CF_3CFH_2$ and $CF_3OCH_3$. A most preferred mixture has a mass composition ratio of $CF_3OCH_3$ and $CF_3CFH_2$ of between 1:1 and 8:1. This azeotropic mixture has a boiling point of about −27° C. at 101.3 kPa.

The present invention also includes as a preferred composition an azeotrope comprising a mixture of a hydrofluoroether of the formula $C_2F_nH_{(6-n)}O$, wherein n is 2,3,4, or 5, with a hydrofluoroether of the formula $C_2F_nH_{(6-n)}O$, wherein n is 2,3,4, or 5, it being understood that these hydrofluoroethres are not the same compound.

An additional azeotrope of the present invention comprises a mixture of a hydrofluoroether of the formula $C_2F_nH_{(6-n)}O$, wherein n is 2,3,4, or 5, and a saturated or unsaturated hydrocarbon containing 3, 4, or 5 carbon atoms. More preferred is a mixture of $CF_3OCF_2H$ and cyclopropane, and most preferred is a mixture having a mass composition ratio of $CF_3OCF_2H$ to cyclopropane of between 2.5:1 and 9:1. This most preferred azeotropic mixture has a boiling point of about −59° C. at 101.3 kPa.

Another azeotrope included within the present invention is a mixture comprising a hydrofluoropropane of the formula $C_3F_nH_{(8-n)}$ wherein n is 2, 3, 4, 5, 6, or 7, and a hydrofluorocarbon of the formula $C_xF_nH(2x+2-n)$ wherein x is 2 or 3, and wherein n is 4, 5, 6, or 7. More preferred is a mixture of $CF_3CF_2CH_3$ and $CF_3CHFCF_3$. A most preferred composition is a mixture of $CF_3CF_2CH_3$ and CF3CHFCF3 having a mass composition ratio of $CF_3CF_2CH_3$ and $CF_3CFHCF_3$ of between 0.25:1 and 1:1. This most preferred azeotropic mixture has a boiling point of about −20° C. at 101.3 kPa. Another more preferred composition is a mixture of $CF_3CF_2CH_3$ and $CF_2HCF_2H$. Most preferred is a mixture having a mass composition ratio of $CF_2HCF_2H$ to $CF_3CF_2CH_3$ of between 0.6:1 and 2.5:1. This most preferred azeotropic mixture has a boiling point of about −21° C. at 101.3 kPa.

Further included in the present invention is an azeotrope comprising a hydrofluoropropane of the formula $C_3F_nH_{(8-n)}$ wherein n is 2, 3, 4, 5, 6, or 7, and a saturated or unsaturated hydrocarbon containing 3, 4, or 5 carbon atoms.

The preparation of the compounds noted above as specifically included within the azeotropic mixtures will be known to those skilled in the art of refrigerant synthesis with the exception of $CF_3CF_2CH_3$. This compound can be prepared by reacting $CF_3CF_2CH_2OH$ with Tosyl-chloride in base, then reacting the product with $LiAlH_4$ at 85–90° C. The reaction yielded 86 percent $CF_3CF_2CH_3$.

The invention includes a process using the azeotropes described above as refrigerants for cooling an object or area. The process comprises the steps of condensing the refrigerant, then evaporating the refrigerant in the vicinity of the object to be cooled. The process can be carried out in equipment employing the standard refrigeration cycle, which would generally include a compressor for pressurizing the refrigerant in its vapor phase, a condenser for condensing the refrigerant, an expansion valve for reducing the pressure of the liquid refrigerant, and an evaporator in which the refrigerant returns to the vapor phase. The phase transformation at the evaporator causes the refrigerant to absorb heat from its surroundings, thus having the effect of cooling the immediate vicinity. It is understood, however, that the azeotropic refrigerants described above are suitable for use in any refrigeration operation which currently uses known CFC or HCFC refrigerants. Modifications to the standard refrigeration system may include the presence of one or more heat exchangers in addition to the evaporator and the condenser. Examples of equipment capable of using the process include, but are not limited to, centrifugal chillers, household refrigerator/freezers, automotive air conditioners, refrigerated transport vehicles, heat pumps, supermarket food coolers and display cases, and cold storage warehouses.

The process described above can also be used to heat an object or area in the vicinity of the azeotrope as it condenses. During the condensation step, the azeotrope transfers heat to its surroundings, thus warming the immediate vicinity. As above, it is understood that use of this process is not limited to equipment employing the standard refrigeration cycle; the process is suitable for use on any heating apparatus that uses CFC or HCFC refrigerants.

The present invention also includes zeotropic mixtures useful as refrigerants. In contrast to an azeotropic mixture, which has a single boiling point, a zeotropic mixture has a boiling point temperature range over which the mixture vaporizes. As a zeotrope boils, the vapor consists of a mixture of the two components, but by definition the vapor mixture contains a different component mass composition ratio than does the liquid phase. In the early stages of boiling, a greater percentage of the lower boiling component (LBC) vaporizes than does the higher boiling component (HBC), with the result being a higher mass ratio of LBC to HBC in the vapor phase than in the liquid phase, and a lower mass ratio of LBC to HBC in the liquid phase. This change in liquid composition shifts the boiling point of the remaining liquid to a higher temperature. This process continues in this manner as the liquid boils, with the temperature of vaporization continuing to increase as the proportion of the HBC in the liquid phase increases. Accordingly, in the later stages of boiling, a higher percentage of the HBC is boiling; consequently, this phase transformation occurs at a higher temperature than that of initial boiling.

The existence of such a boiling point range, or temperature "glide", can be of great advantage in refrigeration and heating applications. See Didion, The Role of Refrigerant Mixtures as Alternatives, Proceedings of ASHRAE CFC Technology Conference, Gaithersburg, Md. (1989), for a complete analysis of composition shifting and counter-current heat exchange. An example of a system in which a temperature glide can be advantageous is one which includes counter-current heat exchange to and from the refrigerant. The temperature glide of a zeotrope can be used to reduce significantly the irreversibilities of the constant-temperature heat transfer process inherent in a process using a pure refrigerant or an azeotrope. Zeotropes are also particularly suitable in systems that include multiple evaporators which cool different areas at different temperatures, and in systems such as heat pumps may utilize composition shifting.

The present invention includes zeotropic mixtures containing at least two components, the first of which is a hydrofluoroether of the formula $C_2F_nH_{(6-n)}O$, wherein n is 2, 3, 4, or 5, and the second of which is a hydrofluorocarbon of the formula $C_xF_nH_{(2x-n)}$, wherein x is 1, 2, or 3, and n is 2, 3, 4, 5, 6, or 7, or a saturated or unsaturated hydrocarbon containing 3, 4, or 5 carbon atoms.

A preferred composition is a mixture of a hydrofluoroether of the formula $C_2F_nH_{(6-n)}O$, wherein n is 2, 3, 4, or 5, and a hydrofluorocarbon of the formula $C_xF_nH_{(2-n)}$ wherein x is 1, 2, or 3, and n is 2, 3, 4, 5, 6, or 7. Particuiarly preferred as the first component are $CF_3OCH_3$ and $CF_3OCF_2H$, and as the second component are $CF_2HCF_2CFH_2$, $CF_3CH_2CF_2H$, and $CF_2H_2$. More particularly preferred are an $CF_3OCH_3/CF_2HCF_2CFH_2$ mixture, which is most preferred in a mass composition ratio of between 1:1 and 2:1; a $CF_3OCH_3/CF_3CH_2CF_2H$ mixture, which is most preferred in a mass composition ratio of between 1:1 and 2:1; a $CF_3OCH_3/CF_2H_2$ mixture, which is most preferred in a mass composition ratio of between 0.5:1 and 1:1; a $CF_3OCF_2H/CF_2HCF_2CFH_2$ mixture, which is most preferred in a mass composition ratio of between 3:1 and 5:1; and a $CF_3OCF_2H/CF_3CH_2CF_2H$ mixture, which is most preferred in a mass composition ratio of between 2:1 and 3:1.

Other preferred compositions include a mixture of a hydrofluoroether of the formula $C_2F_nH_{(6-n)}O$, wherein n is 2, 3, 4, or 5, and another hydrofluoroether of the formula $C_2F_nH_{(6-n)}O$, wherein n is 2, 3, 4, or 5, it being understood that the first and second components are not the same chemical compound, and a mixture of a hydrofluoroether of the formula $C_2F_nH_{(6-n)}O$, wherein n is 2, 3, 4, or 5, and a saturated or unsaturated hydrocarbon containing 3, 4, or 5 carbon atoms.

The preparation of the constituents of these hydrofluoroether-based zeotropes will be known to those skilled in the art of refrigerant synthesis with the exception of $CF_3CH_2CF_2H$. This compound can be prepared by reacting $CF_3CH=CF_2$ with 0.5 percent Pd on carbon at 100° C. in the presence of 500 psi $H_2$. The reaction yields approximately 90 percent $CF_3CH_2CF_2H$.

The present invention includes a cooling process in which these zeotropes serve as refrigerants. The process comprises condensing the zeotropic refrigerant, then evaporating the refrigerant in the vicinity of the object or area to be cooled. More preferred is a process in which heat is transferred to and from the refrigerant in counter-current heat exchangers. Another preferred process is one in which the refrigerant undergoes multiple evaporation steps, each of which evaporates a portion of the refrigerant. Also preferred is a process in which composition shifting is utilized. More preferred is a process in which heat is transferred to and from the refrigerant and multiple evaporations with multiple refrigeration temperatures are required. An example of such a process, shown in FIG. 1, is described in Lorenz & Meutzner, *On Application of Non-Azeotropic Two-Component Refrigerants in Domestic Refrigerators and Home Freezers*, Proceedings from the International Institute of Refrigeration Convention, Moscow (1975). The system includes a single compressor, condenser, and expansion valve, but includes two evaporators. The system depicted in FIG. 1 shows two heat exchangers, one between the evaporators, and one between the second evaporator and the compressor; the presence of either or both of these is optional. In the first evaporator, a portion of the refrigerant containing an increased percentage of HBC to LBC as compared to the liquid is vaporized, thus cooling the area or object around the evaporator. The mixture is then passed through a counter-current heat exchanger to be heated by condensed mixture passing from the condenser to the expansion valve. Once heated, the mixture passes to a second evaporator in which the remaining portion of the refrigerant, which contains a higher percentage of HBC, vaporizes at a temperature higher than that of the first evaporation. Consequently, the cooling of a nearby object will be at a higher temperature than that produced by the first evaporation. It will be appreciated by those skilled in the art that the benefit of such a process is the capability of cooling two areas at different temperatures while using the same refrigerant mixture. As an example, such a process could be used in a refrigerator-freezer combination, with the lower boiling component evaporating in the freezer compartment and the higher boiling component evaporating in the refrigerator compartment.

The process can also be used to heat an object in the vicinity of the condensing refrigerant. More preferred is a process in which heat is transferred to and from the refrigerant in a counter-current heat exchanger. Also more preferred are processes in which composition shifting is employed, and in which multiple vaporators are used. A heat pump is particularly suitable for this operation, as it requires a refrigerant that can cool as well as heat; thus a zeotrope with a sizable temperature glide can provide the needed volumetric capacity for heating and the high efficiency required for economical cooling.

The present invention also includes zeotropes comprising two components, the first of which is a hydrofluoropropane of the formula $C_3F_nH_{(8-n)}$, wherein n is 2, 3, 4, 5, 6, or 7, and a second of which is a hydrofluorocarbon of the formula $C_xF_nH_{(2x+2-n)}$ wherein x is 1, 2, or 3, and n is 2, 3, 4, 5, 6, or 7, or a saturated or unsaturated hydrocarbon containing 3, 4, or 5 carbon atoms. Preferred are mixtures of a hydrofluoropropane of the formula $C_3F_nH_{(8-n)}$, wherein n is 2, 3, 4, 5, 6, or 7, and a hydrofluorocarbon of the formula $C_xF_nH_{(2x+2-n)}$ wherein x is 1, 2, or 3, and n is 2, 3, 4, 5, 6, or 7; and mixtures of a hydrofluoropropane of the formula $C_3F_nH_{(8-n)}$, wherein n is 2, 3, 4, 5, 6, or 7, and a saturated or unsaturated hydrocarbon containing 3, 4, or 5 carbon atoms. Particularly preferred hydrofluoropropanes are $CF_2HCF_2CFH_2$, $CF_3CH_2CF_2H$, $CF_3CF_2CH_3$, and $CF_3CFHCF_3$. Particularly preferred hydrofluorocarbons are $CF_2HCH_3$, $CF_3CF_2CH_3$, $CF_3CH_2CF$ H, $CF_3CFHCF_3$, $CF_3CFH_2$, and $CF_2H_2$, although it is understood that if $CF_3CH_2CF_2H$, $CF_3CF_2CH_3$, or $CF_3CFHCF_3$ were used as the first component, it would not also be used as the second component. Particularly preferred hydrocarbons are cyclopropane and $C_3H_8$, More preferred are zeotropic mixtures of $CF_2HCF_2CFH_2$ and $CF_2HCH_3$, $CF_3CF_2CH_3$, $CF_3CH_2CF_2H$, $CF_3CFHCF_3$, $CF_3CFH_2$, $CF_2H_2$, cyclopropane, or $C_3H_8$; zeotropic mixtures of $CF_3CH_2CF_2H$ and $CF_3CFH_2$, $CF_2H_2$, $CF_2HCH_3$, cyclopropane, or $C_3H_8$; a zeotropic mixture of $CF_3CF_2CH_3$ and $CF_2H_2$; and a zeotropic mixture of $CF_3CFHCF_3$ and $CF_2H_2$. The most preferred mass composition ratios for these mixtures are provided in Table 1.

The present invention also includes a cooling process in which the zeotropes described above are used to refrigerate an object or area. The steps of the process comprise the condensing of the refrigerant, then evaporating the refrigerant in the vicinity of the object to be cooled. More preferred are embodiments of the

TABLE 1

PREFERRED MASS COMPOSITION RATIOS FOR HYDROFLUORPROPANE-BASED ZEOTROPES

| Component 1 | Component 2 | Mass Composition Ratio of Composition 1:Composition 2 |
|---|---|---|
| $CF_2HCF_2CH_3$ | $CF_2HCH_3$ | 0.5:1 to 1:1 |
| | $CF_3CF_2CH_3$ | 0.75:1 to 1.25:1 |
| | $CH_3CH_2CF_2H$ | 0.33:1 to 0.75:1 |
| | $CF_3CFHCF_3$ | 0.75:1 to 1.25:1 |
| | $CF_3CFH_2$ | 0.5:1 to 1:1 |
| | $C_3H_6$ | 0.5:1 to 1:1 |
| | $CF_2H_2$ | 0.2:1 to 0.33:1 |
| | $C_3H_8$ | 0.5:1 to 1:1 |

TABLE 1-continued

PREFERRED MASS COMPOSITION RATIOS FOR HYDROFLUORPROPANE-BASED ZEOTROPES

| Component 1 | Component 2 | Mass Composition Ratio of Composition 1:Composition 2 |
|---|---|---|
| $CF_3CH_2CF_2H$ | $CF_3CFH_2$ | 0.5:1 to 1:1 |
| | $C_3H_6$ | 1:1 to 2:1 |
| | $CF_2H_2$ | 0.33:1 to 0.5:1 |
| | $C_3H_8$ | 0.75:1 to 1.25:1 |
| | $CF_2HCH_3$ | 0.5:1 to 1.25:1 |
| $CF_3CF_2CH_3$ | $CF_2H_2$ | 0.75:1 to 1.25:1 |
| $CF_3CFCF_3$ | $CF_2H_2$ | 0.75:1 to 2:1 | process which would employ multiple evaporation steps, or counter-current heat transfer to and from the refrigerant. Also preferred is a process which utilizes composition shifting. Most preferably, the process would include at least one heat transfer step between refrigerant passing from condenser to expansion valve and refrigerant passing from a first to a second evaporator in a counter-current heat exchanger as described above for the Lorenz-Meutzner system.

The present invention is explained in greater detail in the following non-limiting examples, in which "kPa" means kilopaschals, "kJ" means kilojoules, "m" means meters, temperatures are given in degrees Centigrade, volumes are given in $m^3$/kilogram-mole, dipole moments are given in debeyes, and pressure is given in kilopaschals.

EXAMPLE 1

Description of Empirical Analysis and Computer Cycle Simulation Used to Predict Existence of Azeotropes The azeotropes of the present invention are predicted through the use of a computer program which contains the Carnahan-Starling-Desantis (CSD) equation of state (EOS), an equation of state able to predict thermodynamic properties of mixtures. See Application of a Hard Sphere Equation of State to Refrigerants and Refrigerant Mixtures, NBS Technical Note 1226, U.S. Department of Commerce, for a description of the use of this model. For pure compounds, the CSD equation requires that empirical data on the given material be entered in the form of a set of temperature-dependent EOS paramters which allow the pressure-volume-temperature relationship of the compound to be accurately predicted by the CSD EOS. The EOS has the following form:

$$\frac{pV}{RT} = \frac{1 + y + y^2 - y^3}{(1 - y)^3} - \frac{a}{RT(V + b)}$$

wherein "p" is pressure, "V" is volume, "R" is the gas constant, "T" is temperature, "y"=b/4V, and "a" and "b" are material temperature-dependent terms representing molecular interaction and molecular volume. For a given temperature, "a" and "b" are calculated by:

$$a = a_0 \exp(a_1 T + a_2 T^2)$$

$$b = b_0 + b_1 T + b_2 T^2$$

wherein "$a_0$", "$a_1$", "$a_2$", "$b_0$", "$b_1$", and "$b_2$" are constant for a given material based on its thermodynamic properties. These values are known for most common refrigeration materials; those that were not known were calculated and are shown in Table 2.

For mixtures, the CSD EOS requires the additional input of a temperature independent "interaction parameter" which models the molecular interaction between the molecules of the components of the mixture. For the present invention, empirical data on the dipole moments and molecular volumes of twelve known refrigerants was mathematically regressed to produce the following function for calculating the interaction parameter:

$$f_{12} = f_0 + f_1(DP_1 - DP_2) + f_2(DP_1 - DP_2)^2 + f_3/V_1 V_2$$

wherein "$f_{12}$" is the interaction parameter for the mixture, "$DP_1$" is the dipole moment of the LBC, "$DP_2$" is the dipole moment of the HBC, "$V_1$" is the molecular volume of the LBC at 25° C., and "$V_2$" is the molecular volume of the HBC at 25° C. "$f_0$", "$f_1$", "$f_2$" and "$f_3$" are constants which were produced by the mathematical regression noted above, and are equal to −0.0105822, 0.01988274, 0.03316451, and 0.000102909, respectively. The value for $f_{12}$ was then input into the following equation, which

TABLE 2

Parameters for CSD Equation of State

| Compounds | $a_0$ | $a_1$ | $a_2$ |
|---|---|---|---|
| $CF_3CFHCF_3$ | 4.974321e + 3 | −2.533395e − 3 | −2.177726e − 6 |
| $CF_2HCF_2CFH_2$ | 8.510839e + 3 | −4.498621e − 3 | 1.782586e − 6 |
| $CF_3CF_2CH_3$ | 6.380049e + 3 | −4.663384e − 3 | 1.843722e − 6 |
| $CF_3CH_2CF_2H$ | 8.729749e + 3 | −5.020118e − 3 | 2.332009e − 6 |
| $CF_3OCF_2H$ | 3.112309e + 3 | −1.323961e − 3 | −4.487269e − 6 |
| $CF_3OCH_3$ | 3.039967e + 3 | −1.254090e − 3 | −3.718424e − 6 |

| Compounds | $b_0$ | $b_1$ | $b_2$ |
|---|---|---|---|
| $CF_3CFHCF_3$ | 2.05114e − 1 | −2.274395e − 4 | −1.455371e − 7 |
| $CF_2HCF_2CFH_2$ | 2.343665e − 1 | −4.192604e − 4 | 2.416012e − 7 |
| $CF_3CF_2CH_3$ | 2.216142e − 1 | −4.094399e − 4 | 2.210597e − 7 |
| $CF_3CH_2CF_2H$ | 2.358726e − 1 | −4.540089e − 4 | 2.967103e − 7 |
| $CF_3OCF_2H$ | 1,578207e + 1 | −1.234799e − 4 | −2.510972e − 7 |
| $CF_3OCH_3$ | 1.309991e − 1 | −2.421642e − 5 | −3.156926e − 7 | determines the appropriate value for "a" to be input into the CSD EOS.

$$a_{12} = (1 - f_{12})(a_{11} a_{22})^{1/2}$$

wherein "$a_{11}$" and "$a_{22}$" represent the values of "a" for the individual component materials. The value of $a_{12}$ is then entered into the CSD equation as "a" to permit thermodynamic calculation to be performed for the mixture.

The result of this procedure is that it allows the calculation of the interaction parameter for a given mixture based only on the dipole moment and molecular volume of the individual components, both of which are quantities which can be calculated for individual sample components without experimentation. These interaction parameters are then entered into the CSD equation of state for further calculations on the mixtures.

For the present invention, the procedure for using the CDS equation to determine the existence of an azeotropic composition of a mixture began with the specification of the liquid composition and sample temperature for the mixture. Also specified was that the conditions were at equilibrium between the liquid and vapor phases. Upper and lower pressure limits were then set for the saturation pressure between which convergence of the calculation occurred. At each step in the convergence loop (i.e., for each estimate of pressure), the CSD EOS was used to calculate the liquid and vapor volumes at the specified temperature and pressure estimate. Convergence to the saturation pressure was achieved when the chemical potential between the vapor and liquid phases of each mixture were equal. An azeotrope was determined to exist when the vapor composition matched the liquid composition within 0.1 percent. If no composition match between liquid and vapor phase occurred, then no azeotrope exists. The procedure was then repeated for a new temperature selection.

In the analysis, certain of the mixtures showed at vapor pressure equilibrium that the mass composition of the liquid phase was substantially identical (within 0.1 percent) to that of the vapor phase. This behavior is indicative of an azeotropic mixture.

EXAMPLE 2

Mass Composition Ratios for Azeotropic mixtures

The mass composition ratios for the azeotropic mixtures of the present invention were calculated according to the method described in Example 1. Table 3 sets forth these approximate ratios for each composition at two different temperatures, the ratios being approximations because of possible imprecisions in the predicted thermodynamic data.

EXAMPLE 3

Calculation of Thermodynamic Performance of Azeotrovic Mixtures

The thermodynamic performance of the azeotropic materials was compared to that of known refrigerants through the use of a computer model based on a typical refrigeration cycle. The system modeled included a compressor, a condenser, an expansion valve, and an evaporator. A counter-current heat exchanger permitted heat transfer between refrigerant exiting the evaporator with that exiting the condenser. The compressor was assumed to be 100 per cent isentropic. Refrigerant was modeled to condense at 32° C. in the condenser and to subcool therein to 27° C. The refrigerant entered the evaporator at −40° C. and superheated therein to −35° C. The refrigerant vapor leaving the evaporator was further heated to 28° C. in

TABLE 3

Mass Composition Ratios of Azeotropes

| Azeotrope | Mass Composition Ratio | Temperature | $f_{12}$ |
|---|---|---|---|
| $CF_3OCH_3/CF_3HCH_3$ | 56/44 | −40° C. | 0.0067 |
| | 44/56 | 20° C. | |
| $CF_3OCH_3/CF_2HCF_2H$ | 60/40 | −40° C. | 0.0592 |
| | 56/44 | 20° C. | |
| $CF_3CF_2CH_3/CF_3CFHCF_3$ | 23/77 | −40° C. | 0.0092 |
| | 30/70 | 20° C. | |
| $CF_2HCF_2H/CF_3CF_2CH_3$ | 53/47 | −40° C. | 0.0145 |
| | 68/32 | 20° C. | |
| $CF_3OCF_2H/C_3H_6$ | 77/23 | −40° C. | 0.120 |
| | 79/21 | 20° C. | |
| $CF_3CFH_2/CF_3OCH_3$ | 66/34 | −40° C. | 0.0174 |
| | 84/16 | −20° C. | |
| $CF_3OCF_2H/CF_3CFH_2$ | 81/19 | −40° C. | 0.0681 |
| | 76/24 | 20° C. | | the counter-current heat exchanger. The condensed refrigerant travelling counter to the evaporated refrigerant was subcooled from its condenser exit temperature of 27° C. to the temperature calculated using the refrigerant's liquid and vapor heat capacities in an overall energy balance around the heat exchanger.

The thermodynamic properties of the samples were entered into the model and the performance of each within such a system was analyzed under the CSD equation of state. Values for the calculated volumetric cooling capacity for the refrigerant, the required suction pressure, the compression ratio (defined as the ratio of pressure of the refrigerant exiting the compressor to the pressure of the refrigerant entering the compressor), and coefficient of performance (defined as the ratio of energy transferred in the evaporator to the energy transferred by the compressor, which was calculated by dividing the enthalpy change in the evaporator predicted by the model by the enthalpy change in the compressor predicted by the model) for the azeotropes and known refrigerants for this system are described in Example 4.

EXAMPLE 4

Thermodynamic Performance of Azeotrovic Mixtures

The thermodynamic performance of the azeotropic mixtures of the present invention within a typical refrigeration cycle were calculated as described in Example 3. The required volumetric cooling capacity, pressure ratio, and coefficient of performance for each compound are shown in Table 4 along with the same properties for known CFC refrigerant R-12. It is apparent from the values in Table 4, particularly the coefficient of performance values, that the azeotropes perform comparably with the known CFC refrigerants.

EXAMPLE 5

Calculation of Thermodynamic Properties of Ether-Based and Hydrofluoropropane-Based Zeotropic Mixtures To determine the thermodynamic performance of zeotropic ether-based and hydrofluoropropane-based mixtures, a Lorenz-Meutzner system as shown in FIG. 1 was modeled to represent a typical refrigeration cycle. For the modeling, the CSD equation-of-state was used. The model system specified that a secondary fluid entered the low temperature evaporator at $-15°$ C., exited the low temperature evaporator at $-20°$ C., entered the higher temperature evaporator at $2°$ C, and exited the higher temperature evaporator at $-2°$ C. In the condenser, the secondary fluid entered at $32°$ C. and exited at $40°$ C. A log mean temperature difference across the low temperature heat exchanger of $10°$ C. was assumed as was a log mean temperature difference of $10°$ C. across the high temperature heat exchanger. The compressor was assumed to operate at 55 percent isentropic efficiency. The load ratio of low temperature evaporator to higher temperature evaporator was 1.0.

TABLE 4

PERFORMANCE DATA FOR AZEOTROPES

| Azeotrope | Composition | Evaporator Temperature (° C.) | Coefficient of Performance | Volumetric Capacity (kJ/m3) | Suction Pressure (kPa) | Pressure Ratio |
|---|---|---|---|---|---|---|
| Condensing Temperature = 32° C. | | | | | | |
| $CF_3CFH_2/CF_3OCH_3$ | 68/32 | −20 | 4.118 | 1062 | 136 | 5.98 |
| | | 0 | 7.690 | 2353 | 295 | 2.75 |
| $CF_3OCH_3/CF_2HCH_3$ | 54/46 | −20 | 4.116 | 993 | 126 | 5.91 |
| | | 0 | 7.702 | 2186 | 272 | 2.73 |
| $CF_3OCH_3/CF_2HCF_2H$ | 59/41 | −20 | 4.143 | 1059 | 137 | 5.81 |
| | | 0 | 7.719 | 2314 | 294 | 2.71 |
| $CF_3CF_2CH_3/CF_3CFHCF_3$ | 80/70 | −20 | 4.260 | 775 | 99 | 6.00 |
| | | 0 | 7.881 | 1722 | 215 | 2.75 |
| $CF_3OCF_2H/CF_3CFH_2$ | 79/21 | −20 | 4.101 | 1546 | 223 | 5.12 |
| | | 0 | 7.584 | 3198 | 451 | 2.53 |
| $CF_2HCF_2H/CF_3CF_2CH_3$ | 60/40 | 20 | 4.185 | 858 | 107 | 6.16 |
| | | 0 | 7.796 | 1927 | 236 | 2.79 |
| $CF_3OCF_2H/C_3H_6$ | 78/22 | −20 | 4.028 | 1878 | 292 | 4.60 |
| | | 0 | 7.471 | 3710 | 563 | 2.39 |
| R-12 | 100 | −20 | 4.079 | 3093 | 151 | 5.21 |
| | | 0 | 7.642 | 2278 | 308 | 2.55 |
| Condensing Temperature = 43° C. | | | | | | |
| $CF_3CFH_2/CF_3OCH_3$ | 68/32 | −20 | 3.208 | 972 | 136 | 8.05 |
| | | 0 | 5.406 | 2151 | 296 | 3.70 |
| $CF_3OCH_3/CF_2HCH_3$ | 54/46 | −20 | 3.231 | 919 | 126 | 7.95 |
| | | 0 | 5.454 | 2020 | 272 | 3.68 |
| $CF_3OCH_3/CF_2HCF_2H$ | 60/40 | −20 | 3.223 | 968 | 137 | 7.79 |
| | | 0 | 5.421 | 2113 | 294 | 3.63 |
| $CF_3CF_2CH_3/CF_3CFHCF_3$ | 30/70 | −20 | 3.250 | 689 | 99 | 8.06 |
| | | 0 | 5.430 | 1529 | 215 | 3.70 |
| $CF_3OCF_2H/CF_3CFH_2$ | 79/21 | −20 | 3.126 | 1382 | 223 | 6.75 |
| | | 0 | 5.217 | 2850 | 451 | 3.34 |
| $CF_2HCF_2H/CF_3CF_2CH_3$ | 60/40 | −20 | 3.255 | 781 | 107 | 8.32 |
| | | 0 | 5.471 | 1753 | 236 | 3.77 |
| $CF_3OCF_2H/C_3H_6$ | 75/25 | −20 | 3.093 | 1695 | 292 | 5.96 |
| | | 0 | 5.173 | 3340 | 563 | 3.09 |
| R-12 | 100 | −20 | 3.198 | 1010 | 151 | 6.86 |
| | | 0 | 5.406 | 2104 | 308 | 3.35 |

The thermodynamic properties of the ether-based and hydrofluoropropane-based zeotropic mixtures were entered into this model and the performance of each within this system was predicted using the thermodynamic properties calculated from the CSD equation of state. The performance values for each zeotrope were compared to the performance of known refrigerants within the same system.

EXAMPLE 6

Thermodynamic Properties of Ether-Based and Hydrofluoropropane-Based Zeotropic Mixtures The thermodynamic performance of ether-based and hydrofluoropropane-based zeotropes within the system model described in Example 5 is shown in Tables 5 and 6. The pressure ratio, suction pressure at the compressor, volumetric cooling capacity of the refrigerant, and coefficient of performance for the zeotropes described above are listed along with the predicted performance for known refrigerant R-12. It is apparent from the coefficient of performance values shown in the table that all of the ether-based and hydrofluoropropane-based zeotropes shown are comparable or superior in performance to R-12 in the modeled system.

The foregoing examples are illustrative of the present invention, and are not to be construed as limiting thereof. The invention is defined by the following claims, with equivalents of the claims to be included therein.

TABLE 5

PERFORMANCE DATA FOR ETHER-BASED ZEOTROPES

| Zeotrope | Coefficient of Performance | Volumetric Capacity (KJ/m$^3$) | Suction Pressure (KPa) | Pressure Ratio |
|---|---|---|---|---|
| $CF_3OCH_3$/ $CF_2HCF_2CFH_2$ | 1.484 | 450 | 62 | 12.1 |
| $CF_3OCH_3$/$CF_3CH_2CF_2H$ | 1.428 | 402 | 55 | 13.2 |
| $CF_3OCF_2H$/ $CF_2HCF_2CFH_2$ | 1.422 | 657 | 103 | 10.6 |
| $CF_2H_2$/$CF_3OCH_3$ | 1.397 | 1395 | 227 | 8.7 |
| $CF_3OCF_2H$/ $CF_3CH_2CF_2H$ | 1.380 | 562 | 86 | 11.8 |
| R-12 | 1.316 | 747 | 127 | 9.3 |

TABLE 6

PERFORAMNCE DATA FOR HYDROFLUOROPROPANE-BASED ZEOTROPES

| Zeotrope | Coefficient of Performance | Volumetric Capacity (KJ/m$^3$) | Suction Pressure (KPa) | Pressure Ratio |
|---|---|---|---|---|
| $C_3H_6$/$CF_2HCF_2CFH_2$ | 1.615 | 841 | 124 | 8.2 |
| $CF_2HCH_3$/ $CF_2HCF_2CFH_2$ | 1.562 | 509 | 66 | 11.5 |
| $C_3H_6$/$CF_3CH_2CF_2H$ | 1.552 | 824 | 123 | 8.6 |
| $CF_3CFH_2$/ $CF_2HCF_2CFH_2$ | 1.531 | 541 | 74 | 11.5 |
| $CF_2H_2$/$CF_3CH_2CF_2H$ | 1.525 | 1689 | 251 | 8.1 |
| $CF_2HCH_3$/ $CF_3CH_2CF_2H$ | 1.502 | 446 | 58 | 12.7 |
| $C_3H_8$/$CF_2HCF_2CFH_2$ | 1.480 | 993 | 168 | 7.8 |
| $CF_2H_2$/ $CF_2HCF_2CFH_2$ | 1.480 | 1885 | 293 | 7.7 |
| $CF_3CFH_2$/$CF_3CH_2CF_2H$ | 1.455 | 453 | 61 | 13.3 |
| $C_3H_8$/$CF_3CH_2CF_2H$ | 1.453 | 982 | 168 | 7.9 |
| $CF_2H_2$/$CF_3CF_2CH_3$ | 1.379 | 1589 | 274 | 8.0 |
| $CF_3CF_2CH_3$/ $CF_2HCF_2CFH_2$ | 1.362 | 217 | 29 | 17.0 |
| $CF_2H_2$/$CF_3CFHCF_3$ | 1.351 | 1504 | 269 | 8.1 |
| $CF_3CH_2CF_2H$/ $CF_2HCF_2CFH_2$ | 1.340 | 100 | 12 | 23.4 |
| $CF_3CFHCF_3$/ $CF_2HCF_2CFH_2$ | 1.337 | 209 | 28 | 17.9 |

That which is claimed is:

1. A zeotropic composition useful as a refrigerant consisting essentially of a hydrofluoropropane of the formula $C_3F_5H_3$ and a hydrofluorocarbon of the formula $C_2F_4H_2$.

2. A composition according to claim 1 in which said hydrofluorocarbon is $CF_3CFH_2$.

3. A composition according to claim 2 wherein the hydrofluoropropane is of the formula $CF_2HCF_2CFH_2$.

4. A composition according to claim 2 in which said hydrofluoropropane is $CF_3CH_2CF_2H$.

5. A composition according to claim 2 in which said hydrofluoropropane is $CF_3CF_2CH_3$.

6. A composition according to claim 1 in which said hydrofluorocarbon is $CHF_2CHF_2$.

7. A composition according to claim 6 wherein the hydrofluoropropane is of the formula $CF_2HCF_2CFH_2$.

8. A composition according to claim 6 in which said hydrofluoropropane is $CF_3CH_2CF_2H$.

9. A composition according to claim 6 in which said hydrofluoropropane is $CF_3CF_2CH_3$.

* * * * *